United States Patent [19]
Thibault

[11] 3,932,076
[45] Jan. 13, 1976

[54] HYDRAULIC WHEEL

[76] Inventor: Olida Thibault, 390 De La Briquade, Plainville, Terrebonne County, Province of Quebec, Canada

[22] Filed: June 25, 1974

[21] Appl. No.: 482,991

[52] U.S. Cl. ................ 418/177; 180/66 F; 418/131
[51] Int. Cl.² ...................... B60K 7/00; F04C 1/00
[58] Field of Search .......... 418/131, 175, 176, 177, 418/144; 180/44 F, 66 F

[56] References Cited
UNITED STATES PATENTS

| | | | |
|---|---|---|---|
| 502,818 | 8/1893 | Holland | 418/177 X |
| 1,380,596 | 6/1921 | Rudqvist | 418/177 |
| 3,450,004 | 6/1969 | Ernst | 418/177 X |
| 3,639,093 | 2/1972 | Jansson | 418/177 |
| 3,748,062 | 7/1973 | Wilcox | 418/177 |

*Primary Examiner*—C. J. Husar
*Assistant Examiner*—Leonard E. Smith

[57] ABSTRACT

A hydraulic wheel, more specifically a hydraulic energy converting device, having an inner stator provided with a peripheral camming surface and a rotor, enclosing the stator, and being rotatably mounted relative thereto; the rotor being adapted to cooperate with the camming surface of the stator to define a plurality of liquid-tight working chambers between the camming surface and the stator. Each working chamber has an inlet at one end and an outlet at the other end, the stator having a pressurized liquid distribution system to distribute pressurized liquid from an outer source to the respective inlet of each working chamber and a liquid collection system, independent of the distribution system, adapted to collect liquid from the respective outlet of each working chamber and direct it to the said outer source. A plurality of reciprocating vanes are slidably mounted in the rotor for radial inward movement, a longitudinal edge of each vane remote from the rotor being biased against the camming surface by springs, the vanes being adapted to separate the working chambers into liquid-tight sections whereby pressurized liquid entering into each working chamber through its respective inlet strikes the vanes and transmits a force thereto capable of rotating the rotor while liquid on the side of said vanes opposite that being struck urging the liquid within the working chamber toward the outlet end thereof.

15 Claims, 10 Drawing Figures

HYDRAULIC WHEEL

This invention relates generally to a hydraulic wheel, more specifically a hydraulic energy converting device wherein linear movement of a pressurized liquid is converted into a rotary motion of the rotor means of the hydraulic energy converting device.

Known hydraulic energy converting devices comprising a rotationally mounted rotor means enclosing a stationary stator means have been previously disclosed. However, such devices only utilize the fluid pressure of pressurized liquid to initiate the rotation of the rotor means. Accordingly, in such devices the pressurized liquid is directed into enclosed chambers at right angles to the direction of rotation of the rotor means. As a result, frictional losses within the device are substantially increased and the overall efficiency thereof decreased.

According to a feature of the subject invention, leak-off liquid accumulated behind the vanes may be pumped from one vane slot to another vane slot through suitable passageways, thereby minimizing counter-pressures at high rotational speeds of the rotor means.

In order to reduct sliding pressure between the side surfaces of the stator and the adjacent surfaces of the seal plates, another feature of the subject invention makes use of a pressurized liquid balancing system, whereby sliding friction between the adjacent rotatably moving surfaces is minimized.

According to the present invention, the hydraulic energy converting device comprises a stator and a rotor enclosing the stator, the latter having flat side surfaces and a peripheral camming surface while the former has a pair of cover plates having flat inner surfaces located adjacent the stator side surfaces. The cover plates are jointed together, at the periphery, by guide ring means that extends between them. The latter has a cylindrical inner surface facing the stator camming surface and defining therewith a plurality of successive working chambers. Pressurized fluid is fed, through the stator, at one end of each chamber and exhausted from the opposite end of each chamber. A plurality of vanes are mounted in the rotor power ring radially with respect to the stator, being biassed into the working chamber against the stator camming surface. The vanes separate the working chambers into at least two sections whereby pressure fluid entering the chambers through the inlets engages the vanes successively and imparts rotary motion to the rotor and then exhausts through the outlets. Sealing assemblies are provided to hinder pressure fluid from the chambers to flow between the rotor and the stator flat surfaces, these assemblies comprising annular grooves, one in each of the cover plate inner surface, such grooves being located to overlap adjacent side surfaces of the power ring and stator; annular sealing pistons in the grooves sealingly closing the grooves and defining therewith and with the cover plates enclosed pressured chambers; second annular grooves, a plurality in each one of the stator side surfaces, such second grooves being narrower than, and facing, the first grooves; and communications means between the enclosed chambers, the second grooves and the working chambers whereby pressure fluid from the working chambers creates pressure forces in each of the enclosed chambers greater than that in the opposed second grooves thereby resulting in a pressure differential pressing the sealing plates against the stator side surfaces and the power ring.

In drawings which illustrate one embodiment of the subject invention.

Figures 1, 2:
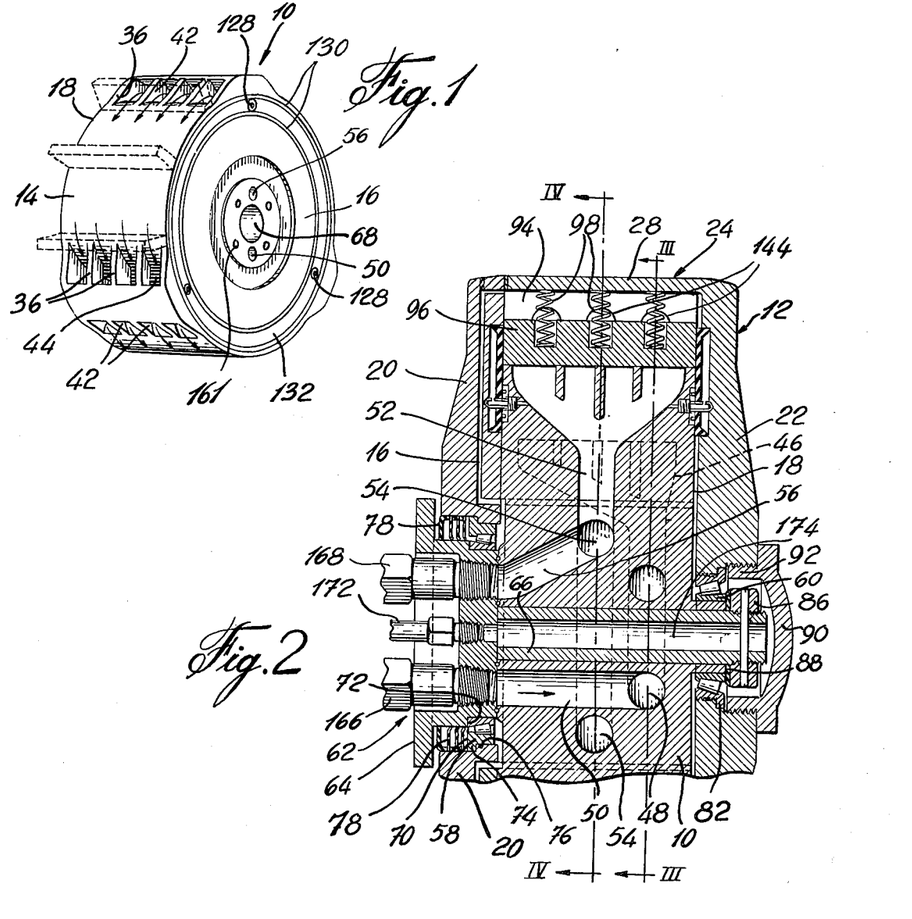
FIG. 1 is a perspective view of the stator, illustrating in phantom the engagement of the reciprocating vanes with the camming surface thereof.
FIG. 2 is an axial cross-section of the upper portion of the assembled stator and rotor means.

In FIGS. 1 to 5, the embodiment illustrated comprises essentially a stator indicated by reference numeral 10 and a rotor means indicated by reference numeral 12. As best seen in FIG. 1, the stator 10 has a circumferential camming surface 14 and two side surfaces 16 and 18. Disposed adjacent each of the side surfaces 16 and 18 is a cover plate 20 and 22 respectively, the cover plates forming the sides of the rotor means 12.

Figure 5:
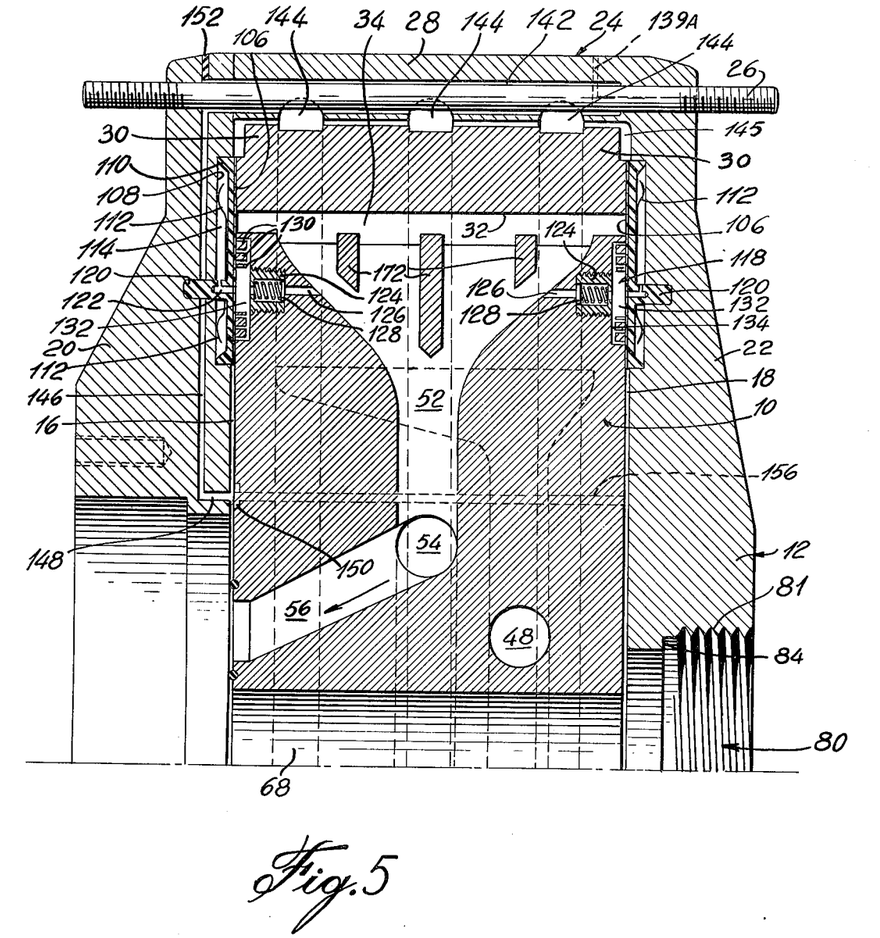
FIG. 5 is a cross-section of part of the stator and rotor means taken through the central axis of the device.
Figure 7:
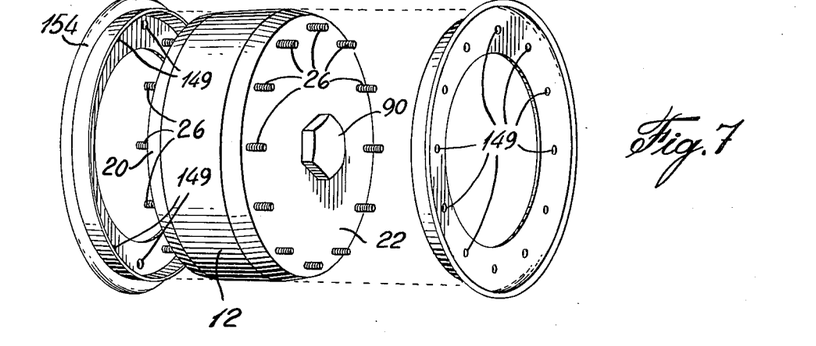
FIG. 7 is an exploded view in perspective, of the rotor means and stator when assembled, further illustrating tire rims to be mounted on the sides of the hydraulic energy converting device.

The cover plates 20 and 22 are held in position with respect to the stator by means of an open-ended cylindrical guide ring means 24 which is secured to the cover plates by suitable fasteners, illustrated in FIGS. 5 and 7 as comprising studs 26. The guide ring means 24 comprises an outer open-ended cylindrical housing member 28 and an inner open-ended power ring 30. The power ring 30 has a cylindrical inner surface 32 which cooperates with the outer camming surface 14 of the stator to form two surfaces of liquid-tight working chambers 34.

Figure 3:
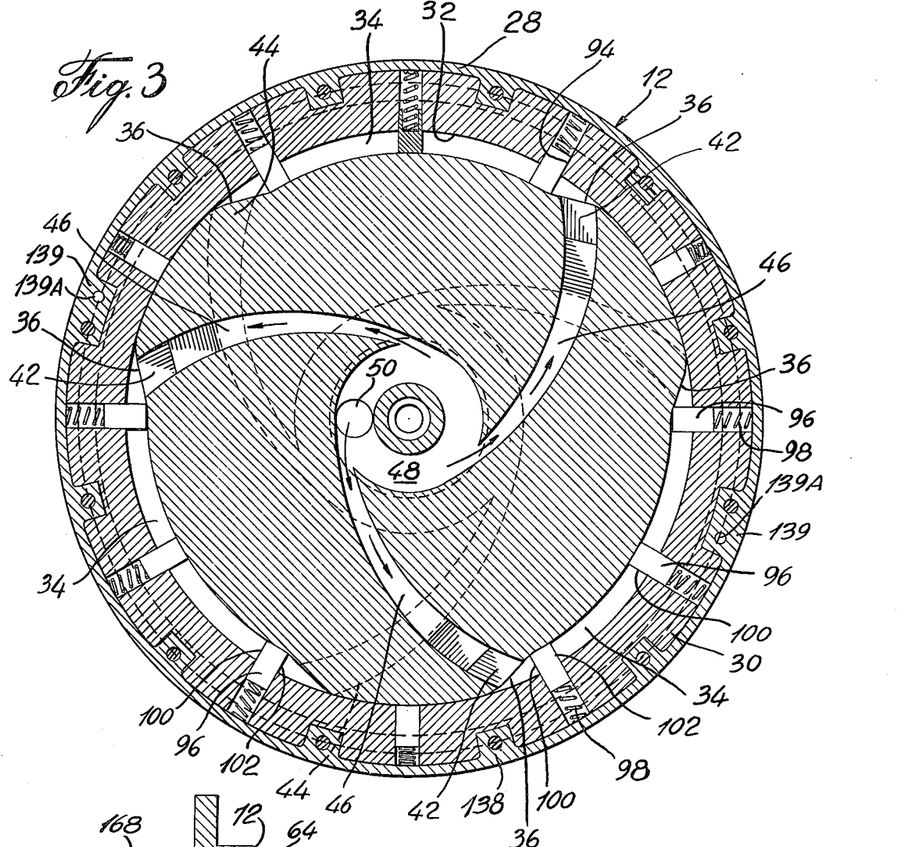
FIG. 3 is a transverse cross-section of the embodiment of FIG. 2, taken along the line III—III.
Figure 4:
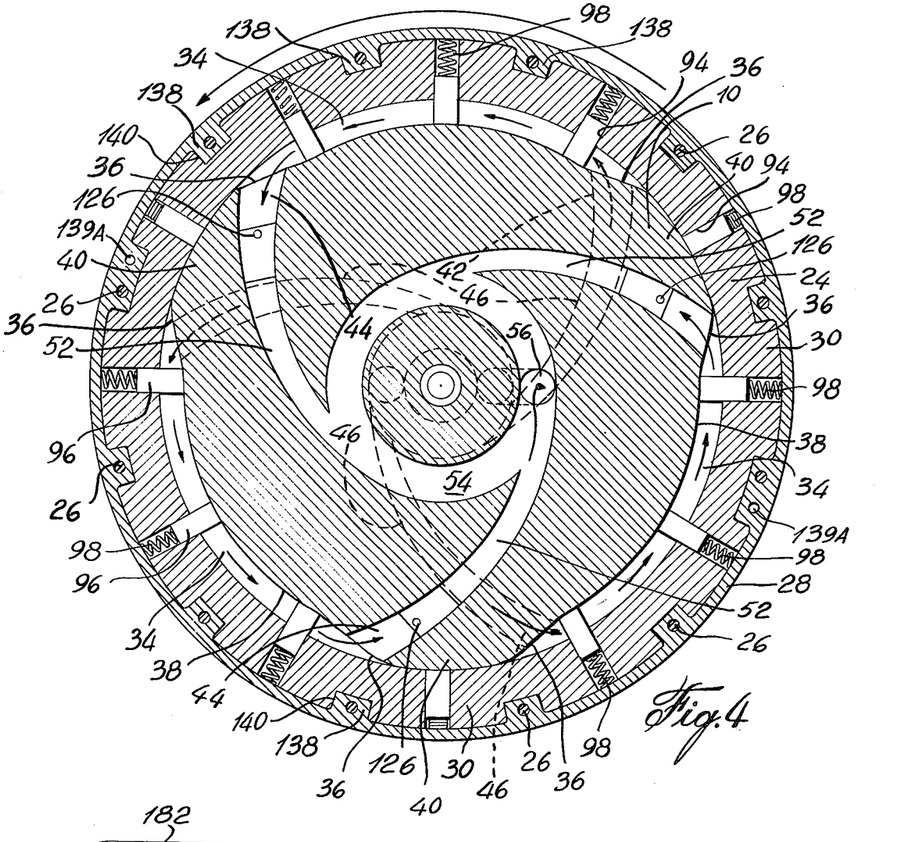
FIG. 4 is a transverse cross-section of the embodiment of FIG. 2, taken along the line IV—IV.

As best illustrated in FIGS. 3 and 4, the hydraulic energy converting device according to the preferred embodiment utilizes three liquid-tight working chambers, which are equally distributed around the periphery of the stator so as to achieve an equilibrium in the application of working forces within the device, as will be described later in greater detail. While the preferred embodiment of the invention shown in the drawings comprises three working chambers, the number of working chambers utilized can be varied according to the application of the hydraulic energy converting device. With respect to the preferred embodiment, however, each of the three working chambers subtends an angle at the center of the stator of approximately 12°. The opposite end of each working chamber 34 includes sloped portions 36 and, extending between the inner edges of the sloped portions 36, are circumferential depressions 38, while circumferential hills 40 extend between the outer edges of the sloped portions 36. A lubrication clearance is left between ring 30 and hills 40 for smooth rotation of ring 30.

As best seen in FIG. 1, sloped portions 36 include ports which form inlets 42 and outlets 44 for each working chamber 34. Each inlet 42 is associated with a respective distribution passage 46, there being therefore three inlets and three respective distribution passages for each of the three working chambers 34 shown in the preferred embodiment. The distribution passages 46 spiral outwardly from the outer periphery of a distribution manifold 48 in a counter clockwise direction to the closest chamber inlet. The manifold is of toroidal shape and is situated within the interior of the stator 10, the distribution passages being substantially tangential therto to minimize frictional losses when pressurized liquid passes from the manifold 48 to the passages 46. A supply light 50 connects the distribution manifold 48 with the side surface 16 of the stator, whereby pressurized liquid from a source exterior to the stator can be supplied thereto.

Associated with each outlet 44 of each working chamber 34 is a collection passage 52 which spirals inwardly towards the outer periphery of a collection manifold 54 in a clockwise direction, the collection manifold 54 comprising a toroidal chamber within the interior of the stator 10 and being connected to the side surface 16 of the stator by a discharge outlet 56. The collection manifold 54 and collection passages 52 are independent from the respective distribution manifold 48 and distribution passages 46 even though both the distribution and collection systems are situated within the stator. By reversing the direction of flow of pressurized liquid through the distribution manifold 48 and passages 46, and therefore through the collection manifold 54 and passages 56, the opposite direction of rotation of the rotor means can be achieved. As a result, the functions of the collection system and the distribution system can be reversed by reversing the direction of flow of pressurized liquid therethrough.

Each distribution passage 46 is identical and spirals outwardly from the periphery of the distribution manifold 48 in the direction of rotation of the rotor means 12 and terminates at the nearest working chamber inlet, such that none of the distribution passages overlap within the stator 10. The distribution passages 46 increase in cross-section area from the distribution manifold to the respective inlets 42 and each cooperates with its inlet 42 to direct pressurized liquid into a working chamber 34 substantially in the direction of rotation of the rotor means. Likewise, each collection passage 52 spirals outwardly from the collection manifold 54 in a direction opposite to the direction of rotation of the rotor means and terminates at the nearest working chamber outlet 44. Each collection passage 52 and working chamber outlet 44 cooperate to guide pressurized liquid out of the working chamber 34 substantially in the direction of rotation of the rotor means. As a result, frictional losses of the pressurized liquid are minimized within the distribution and collection systems.

Figure 6:
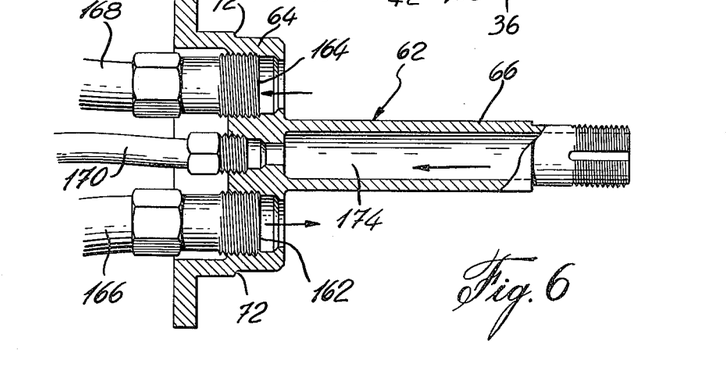
FIG. 6 appears on the second page of the drawings and illustrates a partially broken away side view of the spindle, to which the connecting hoses are attached.

To permit rotation of the rotor means 12, each of the cover plates 20 and 22 is mounted by means of bearing means 58 and 60, respectively, on a spindle 62. As illustrated in FIGS. 2 and 6, the spindle 62 comprises a flange portion 64 secured to an end of a shaft 66, the shaft 66 being adapted to be inserted into an axial bore 68 (FIG. 5) which extends along the central axis of the stator 10. The bearing means 58 has an outer face 70 which is held in position against a shoulder 72 (FIG. 6) of the flange portion 64. The bearing means 58 also includes an outwardly extending flange 74 adjacent an outer side surface 70 of the bearing means 58, the inner edge of which is held in position against a cooperating shoulder 76 of the cover plate 20. Situated between the outer side surface 70 of the bearing means 58 and the flange portion 64 is a seal 78 which is designed to prevent leakage of leak-off liquid used to lubricate the bearing means 58.

Bearing means 60 has an exterior surface which engages an opening 80 in the cover plate 22. In addition, the bearing means 60 includes an outwardly extending annular flange 82 adjacent its outer side surface, the inner edge of which bears against a step portion 84 within the opening 80. A lock nut 86 and washer 88, mounted on the threaded end portion of shaft 66, further retain the bearing means 60 in position. A cap 90 having a cylindrical projection 92 with a threaded exterior is inserted into a cooperating threaded portion 81 of the opening 80, thereby forming an enclosed reservoir in which leak-off liquid can be by-passed to the conduit 174.

The flange portion 64 of the spindle 62 is adapted to be secured to the stator 10 by suitable fasteners means, such as screws which are inserted through the flange portion into screw holes 161 in the stator 10. The flange portion 64 includes supply line connection means 162 and discharge line connection means 164, (FIG. 6) which are adapted to support a pressurized liquid supply hose 166 and a discharge hose 168 respectively. When the spindle 62 is inserted into the stator 10, the supply line connection means 162 and the discharge line connection means 164 are aligned adjacent the distribution supply inlet 50 and the collection discharge outlet 56 respectively, whereby pressurized liquid can be supplied to and remove from the stator through connecting hoses 166 and 168, which transport pressurized liquid from an exterior supply system to the hydraulic energy converting device.

In order to initiate rotation of the rotor means 12, the power ring 30 of the guide ring means 24 includes slots 94 extending parallel to the axis of the power ring, as seen in FIGS. 3 and 4. Within each slot 94 is reciprocally mounted a vane 96, the radially inner edge of which is biased against the camming surface 14 by resilient means 98 mounted between the radially outer edge of each vane 96 and the inner surface of the housing member 28. The width of each vane 96, the power ring 30 and the stator 10 are equal to facilitate alignment and prevent leakage of pressurized liquid past the vanes within the working chambers. The resilient means 98 comprises three coil springs associated with each vane 96, the coil springs being equally spaced across the width of the power ring 30 in order to obtain a uniform application of force across the width of each vane. Each vane 96 is adapted to separate a respective working chamber into liquid-tight section, whereby pressurized liquid entering each working chamber through its respective inlet 42 engages a first transverse surface 100 of successive reciprocating vanes and transmits a force thereto, thereby initiating rotation of the rotor means while an opposite treansverse surface 102 of the successive reciprocating vanes urges liquid within the working chamber toward the working chamber outlet 44.

The power ring 30 includes circumferential liquid transfer passageways 144 joining vane slots 94, whereby liquid entering each slot past a respective reciprocating vane is transferred through the transfer passageways 144 from one vane slot to an adjacent vane slot as a respective reciprocating vane 96 is urged radially outwards by the camming surface 14. The passageways 144 prevent the creation of a partial vacuum within the device due to the reciprocating movement of the vanes 96, and also avoid counterpressures behind the vanes that would interfere with their movement during high rotational speeds of the rotor means 12. The coil springs providing the resilient means 98, in addition to biasing the vanes against the camming surface 14, also serve to suspend and centralize the power ring 30 relative to the stator 10.

Each of the vanes 96 is rectangular in shape, and the length thereof is identical to the width of the power ring 30. The vanes are relatively thin in order to minimize the area occupied within the working chamber 34, such that the force of the resilient means 98 exceeds the pressure of the pressurized liquid when advancing the vanes along the sloped portions 36 of the working chamber from the cylindrical hill 40 to the depression 38. At the same time, the vanes 96 must have adequate strength in order to resist bending forces caused by the pressurized liquid being applied to the first transverse surface 100 thereof. In addition, the weight of the vane cannot be so great as to create centrifugal forces due to the rotation of the rotor means which would exceed the retracting forces of the resilient means 98. To provide the required sealing action so as to avoid undesirable leaks, the vanes must at all times be in contact with the camming surface 14. The sliding surface of the vanes 96 against the camming surface 14 is to be properly coated with a special polymer composition having a very low coefficient of friction, as well as having a high resistance to wear.

Proper side sealing for the working chambers 34 is obtained through sealing and alignment means according to FIG. 5 which comprise annular wear plates 106 secured to annular piston cups 110 slidably mounted in cooperating annular grooves 108 within the cover plates 20 and 22. The piston cup and wear plate assemblies are biased against the ring 30 and the stator 10 by resilient means in the form of leaf spring 112 mounted between the cooperating annular grooves 108 and the piston cups 110, enclosed chambers 114 being thus formed between the piston cups and the cooperating annular grooves. In each case, at least one passageway 122 passes through the annular plate 106 and the piston cup 110, joining the enclosed chamber 114 and a groove 132 of pressure feed means 118 situated in the stator 10. The annular piston cup 110 has several pins 120 rigidly secured to respective cover plate 20, 22 at locations within the annular groove 108. The annular plates 106 are urged by such pins 120 to rotate with the respective cover plate 20, 22 as the rotor 12 rotates with respect to the stator 10. The passageway 122 serves for communicating the enclosed chamber 114 with the pressure feed means 118, whereby pressurized liquid in the stator 10 and thus in the pressure feed means 118 is sent into the enclosed chamber 114. Because of the difference in radial extents between chamber 114 and groove 132, a differential pressure force exists which urges the annular plate 106 into contact with the side surfaces of the stator and of the power ring 30.

The pressure feed means 118, as indicated, comprises an annular groove 132 in either side surface 16, 18 of the stator 10. Means 124 are provided within the stator 10 to allow communication between the annular groove 132 and the working chambers 34, whereby pressurized liquid may be directed to the annular groove from the chambers 34. The communicating means 124 comprises pressure feed passages 126 each having a uni-directional valve 128 which permits the flow of pressurized liquid only in the direction from the working chambers to the groove 132. The uni-directional valve 128 prevents the leakage of pressurized liquid from the pressure feed passage 126 to the working chambers 34, through passages 46 and 52. The use of the uni-directional valves 128 permits the reversing of the direction of rotation of the rotor 12. During reverse rotation of the rotor 12, the collection manifolds 54 become pressurized, and pressurized liquid within the collection passages 52 will be fed through uni-directional valves 128 to the grooves 132. The uni-directional valves 128 connected to the distribution passages 46 will remain closed and prevent escape of pressurized liquid through the uni-directional valves 128 to the distribution manifold 48.

By means of the pressurized liquid within the enclosed chambers 114, annular plates 106 are, as aforesaid, forced against the power ring 30 and the stator 10, thereby forming the sidewalls of the liquid-tight working chambers 34.

The annular plates 106 require sufficient pressure to achieve the sealing effect of the working chambers 34. The pressure within the later has a bursting effect against the side plates 106 and tends to push them away from the side surfaces of the stator 10 which would destroy the power effect of the working chambers 34 by permitting the escape of presurized liquid past the vanes 96 toward the collection passages 52. To avoid this by-pass, the pressure force created within the enclosed chambers 114 must exceed at all times the pressure force within the feed grooves 132. As aforesaid, the pressurized liquid within the enclosed chambers 114, acting on a much larger surface area than the combined areas of the grooves 132 and the portion of the annular plates 106 forming the sidewalls of the working chambers 34, the resulting force will exceed that within the grooves 132 and the working chambers 34. If the resulting force being applied against the annular plates 106 is too great and could possibly result in destructive frictional forces leading to a breaking action, a plurality of concentric balancing grooves 103 may be provided in each side surface 16, 18 of the stator 10 at locations adjacent the respective annular plate 106 and concentrically of the central groove 132. Each annular balancing groove is adapted to receive pressurized liquid which exerts a force against the annular plate 106 in a direction perpendicular to the side surface of the stator 10. The force created by the pressurized liquid within the central groove 132 and the balancing grooves 130 provides a slightly lesser force than the force created by the pressurized liquid within the enclosed chambers 114. As best seen in FIG. 1, a series of seven such concentric balancing grooves 130 are machined on both side surfaces 16 and 18 of the stator 10. As mentioned, the central grooves 132, which are wider than the others, are aligned with the pressure feed passages 126 and uni-directional valves 128, and thereby also functions as the pressure feed means 118. The concentric balancing grooves are about ⅛ of an inch deep and are interconnected by radially extending channels 134.

The sliding face of each annular plates 106 is coated with a Teflon (Trade Mark) composition, or other appropriate polymer, capable of withstanding a wide range of operating temperatures, while exhibiting a very low coefficient of sliding friction so as to minimize abrasive wear.

The rotational force is transferred from the power ring 30 to the housing member 28 by means of bosses 138 which are integral with it and extend inwardly from the interior surface of the housing member 28. Cooperating grooves 140, housing the bosses 138, are situated within the exterior cylindrical surface of the power ring 30, the bosses 138 and the cooperating grooves 140 being in longitudinal alignment with and parallel to the central axis of the rotor 12. As well as functioning as driven splines for the power ring 30, bosses 138 serve as reinforcement for the housing member 28, and include guiding passages for the studs 26. As best seen in FIG. 5, two of the bosses 138 have bores larger in diameter than its respective stud 26, thereby forming a tubular channel 142 around the stud, which is interconnected with special leak-off channels 146.

Figure 8:
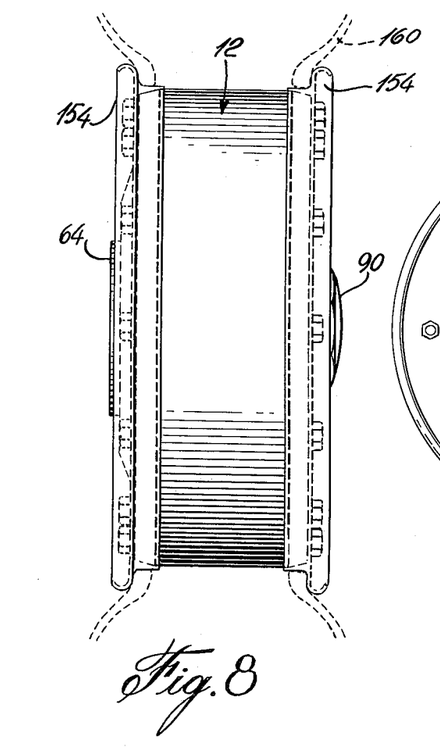
FIG. 8 is a front elevational view of the hydraulic energy converting device with the tire rims mounted thereon, the outline of a portion of a pneumatic tire mounted on the tire rim being illustrated in phantom.
Figure 9:
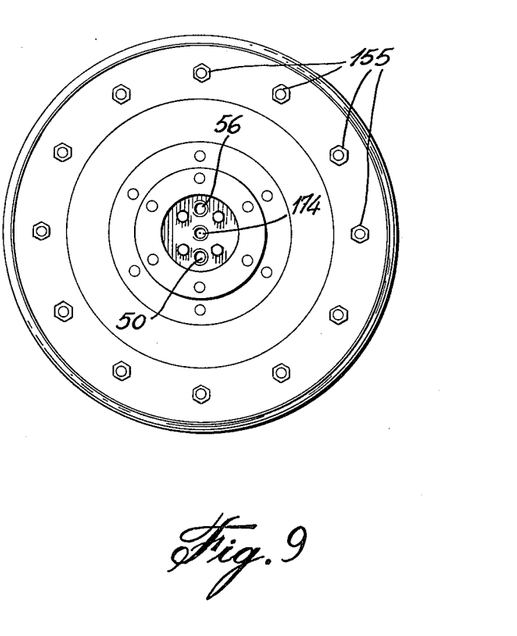
FIG. 9 is a side view of the embodiment of FIG. 8.

Furthermore, the cover plates 20 and 22 are bored so that the studs 26 can be slid therethrough as well as through holes 149 of tire holding rims 154 and the assembly held together by nuts 155 threaded at the ends of the studs 26, as seen in FIGS. 7, 8 and 9. FIG. 8 shows, in phantom, a pneumatic tire 160, there being two special bosses 139 carrying inflating air valves and air passages 139A (FIGS. 3 and 5) which lead to the top of the rim when the device is fitted with a pneumatic tire. As illustrated, the two special bosses 139 are double-sized and located 180° apart.

The above-mentioned leak-off channels 146 are part of a leak-off system provided to withdraw oil that will leak from the working chambers 34 (FIG. 3) around the vanes 96 and into the vane bores 94. For this purpose, the leak-off system comprises three circumferential grooves 144 (FIG. 5) which are semi-circular in cross-section and extend through the power ring 30 to interconnect all vane slots 94. It will also be noted that the grooves 144 extend into the two diametrically opposed enlarged channels 142 for two of the connecting studs 26. The channels 142 in turn connect with the two radial leak-off channels 146, the latter being radially drilled and a plug 152 closing up the outer ends thereof. As a certain amount of oil is expected also to leak from the chambers 34 between the power ring 30 and the piston 110, additional transverse leak-off channels 145 are provided which open into the circumferential grooves 144.

The inward end of the radial leak-off channels 146 communicate with axial holes 148 in cover plate 20, which holes 148 face an annular channel 150 in the face 16 of the stator 10, the said channel 150 in turn communicating with at least one channel 156 extending fully transversally of the stator 10 to open up in the opposite face 18 thereof.

In operation, as the rotor 12 turns around the stator 10, the oil seeping into the vane slots 94 is driven into the circumferential grooves 144 by the vanes 96 which then act as pump pistons. From the latter grooves 144, the leak-off oil successively flows into the transverse stud channels 142, the radial channels 146 and the axial holes 148. Some oil flows in a lubrication clearance between the facing surfaces of the stator and the rotor and the remaining oil flows in transverse channel 156 into a like clearance between opposing faces of the stator and rotor and finally, referring to FIG. 2, flows across the central shaft bearings 60, in the housing formed by cap 90, the central bore 174 of the shaft 66 and out through the hose connection 172. A thus convenient way has been achieved to remove the leak-off oil while lubricating the faces of the stator and rotor facing one another as well as the bearings 58, 60.

In operation of the device, the operating liquid, such as oil, is supplied through the hose 166, enters the manifold supply inlet 50 then the distribution manifold 48, the three distribution passages 46 and flows into the working chambers 34 to strike the vanes 96 and drive the rotor 12. Since the preferred embodiment includes three distribution passages 46, each passage is connected at a tangent to the toroidal distribution manifold at points which are 120° apart. The cross-section of each distribution passage 46 is one third that of the cross-sectional area of the distribution manifold 48, such that an equal flow volume of pressurized liquid through each distribution passage 46 is obtained. The end of each distribution passage 46 adjacent the inlet 42 is widened to encompass the entire width of the sloped portion 36 of the working chamber 34 and the inlet 42. A plurality of struts 172, (FIG. 5) bridge the mouth and serve as reinforcement against strong bursting pressure of the oil at peak torque periods.

Pressurized liquid entering the working chambers 34 through the inlet engages a one transverse surface of a reciprocating vane 96, thereby applying a force thereto which is transmitted to the power ring 30 to cause rotation of the rotor 12. The opposite transverse face of each vane 96 urges, in turn, liquid within the working chamber towards the outlet 44, thereby completing the working cycle within the working chamber 34. The pressurized liquid then moves into the collection passages 52, into the collection manifold 54, and from there into a discharge outlet 56 and through the discharge hose 168.

Figure 10:
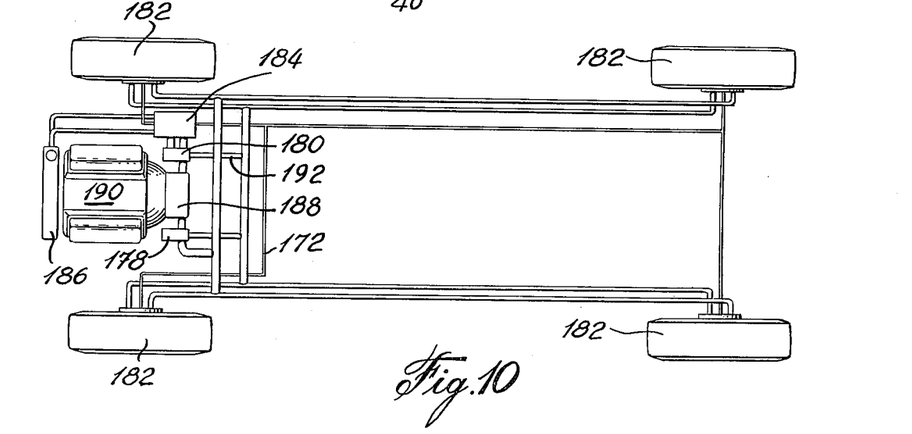
FIG. 10, which appears on the third page of drawings, illustrates schematically the use of the hydraulic energy converting device according to the invention, being applied to a system comprising a four wheel drive for a vehicle.

A control valve 178, as seen in FIG. 10, is utilized to reverse the direction of flow of pressurized liquid through the supply hose 166 and discharge hose 168 thus to reverse rotation of the rotor 12. By utilizing a brake control valve 180 into the pressurized liquid system circuitry, a controlled partial reverse flow of pressurized liquid can be obtained, thus applying a counterpressure against the vanes 96 within the working chambers, thereby decreasing the rotational speed of the rotor 12.

In FIG. 10, the device according to the invention is utilized in association with a four-wheel drive vehicle having penumatic tires 182. The pressurized liquid system, exterior to the energy converting device, includes a reservoir 184 within which the working liquid is stored. Interconnected with this reservoir is a heat exchanger 186 which is utilized to remove accumulated heat from the working liquid. Liquid within the reservoir 184 is pumped to each of the devices associated with each wheel by means of a pump 188 which is operated by means of a motor 190. Pressurized liquid discharged from the pump is directed through a control valve 178 to supply lines leading to each of the four wheels. Discharge lines from each of the four wheels are interconnected to a central discharge line 192 which transports the liquid through the brake control valve 180 and then to the reservoir 184. A leak-off tube 172 leads from each of the four wheels to the reservoir 184, thereby completing the working liquid system when utilized in conjunction with a four-wheel drive vehicle. When utilized for such application, the subject invention would be classified in the light or heavy duty category as to the driving energy required.

While one embodiment of the invention is illustrated with respect to a four-wheel drive vehicle, the proposed invention can be utilized for many other applications. For example, the subject invention can be utilized in combination with V-belt pulleys for industrial drive, for chain drive sprocket wheels, and steel flanged rim for railroad use. In mobile machinery, the proposed invention eliminates such units as the clutch or torque converter, driving shaft and couplings, angular drives, and differential, to name just a few.

I claim:

1. A hydraulic energy converting device comprising: a stator and a rotor, said rotor enclosing said stator; said stator having flat side surfaces and a peripheral camming surface; said rotor comprising a pair of cover plates having flat inner surfaces located adjacent to said stator side surfaces, and a guide ring means extending between and joining said cover plates at the periphery thereof; a power ring having a cylindrical inner surface facing said stator camming surface and defining therewith a plurality of successive working chambers; means in said stator to feed pressure fluid at one end of each chamber and further means in said stator to exhaust said fluid from an opposite end of each chamber; a plurality of vanes mounted in said rotor power ring radially with respect to said stator and resilient means biasing said vanes into said working chambers and against said stator camming surface, said vanes separating said working chambers into at least two sections whereby pressure fluid entering said chambers through said inlets engages said vanes successively and impart rotary motion to said rotor and then exhausts through said outlets; sealing means to hinder pressure fluid from said chambers to flow between said rotor and stator flat surfaces, said sealing means comprising: means defining first annular grooves, one in each of said cover plate inner surfaces, said grooves being located to overlap adjacent side surfaces of said power ring and stator; annular sealing pistons in said grooves sealingly closing said grooves and defining therewith and with said cover plates enclosed pressure chambers; means defining second annular grooves, one in each of said stator side surfaces; said second grooves being narrower than, and facing, said first grooves; and communication means between said enclosed chambers, said second grooves and said working chambers whereby pressure fluid from said working chambers creates pressure forces in each of said enclosed chambers greater than those in the opposed second grooves thereby resulting in pressure differentials pressing said sealing pistons against said stator side surfaces and said power ring.

2. A device as claimed in claim 1, wherein said communication means comprises first conduits leading from said second grooves into said means feeding and exhausting pressure fluid to said working chambers, and second conduits extending across said sealing pistons to bring said enclosed chambers in communication with said second grooves.

3. A device as claimed in claim 2, wherein said second conduits are provided with unidirectional valves preventing flow of pressure fluid from said second grooves toward said exhausting means.

4. A device as claimed in claim 3, wherein said sealing pistons are provided with pins extending into holes of said cover plates to urge relative rotation therewith during rotation of said rotor, said second conduits passing through said pins and opening into said enclosed chambers.

5. A device as claimed in claim 4, wherein each sealing piston is formed of an outer rigid ring and an inner flexible cup-shaped ring, said cup-shaped ring being fixed to said rigid ring and lying in said enclosed chambers; said cup-shaped ring having lateral flanges forcibly applied against sidewalls of said receiving first grooves by the pressure force therein.

6. A hydraulic energy converting device comprising: a stator having two side surfaces and a peripheral camming surface extending therebetween; a rotor means enclosing the stator and being rotatably mounted relative thereto, the rotor means adapted to cooperate with the camming surface of the stator whereby at least one liquid-tight working chamber is established between the camming surface of the stator; each working chamber having an inlet adjacent one end thereof an an outlet adjacent an opposite end thereof; a pressurized liquid distribution system located within the stator, the system adapted to distribute pressurized liquid from a source exterior to the rotor to the respective inlet of each working chamber; a liquid collection system located within the stator and independent of the distribution system, the collection system adapted to collect liquid from the respective outlet of each working chamber and to direct its flow to the source exterior to the stator; a plurality of reciprocating vanes slidably mounted within the rotor means for radially inward movement, a longitudinal edge of each vane remote from the stator means being biased against the camming surface by resilient means mounted within the rotor means, said vanes adapted to separate the at least one working chamber into liquid-tight sections, whereby pressurized liquid entering each working chamber through its respective inlet engages a first transverse surface of successive reciprocating vanes and transmits a force thereto, thereby initiating rotation of the rotor means while an opposite transverse surface of the successive reciprocating vanes urges liquid within the working chamber toward the working chamber outlet; wherein the pressurized liquid distribution system comprises a distribution manifold, a supply inlet to the manifold, and at least one distribution passage which spirals outwardly from the distribution manifold in a direction of rotation of the rotor means and which terminates at the nearest working chamber inlet, there being a separate distribution passage corresponding to each respective working chamber inlet, each distribution passage and respective working chamber inlet cooperating to direct pressurized liquid which has entered the distribution manifold via the supply inlet and passed into the at least one distribution passage into a working chamber substantially in a direction of rotation of the rotor means; and wherein the liquid collection system comprises a collection manifold, a discharge outlet from the collection manifold, and at least one collection passage which spirals inwardly towards the collection manifold in a direction opposite to the direction of rotation of the rotor means and which terminates at the nearest working chamber outlet, there being a separate collection passage corresponding to each respective working chamber inlet, each collection passage and respective working chamber outlet cooperating to guide fluid out of the working chamber substantially in the direction of rotation of the rotor means, and into the collection manifold before exiting therefrom via the discharge outlet, wherein the rotor means includes a cover plate adjacent each of the side surfaces of the stator and a guide ring means secured to the cover plates by suitable fastening means, the power ring means having a cylindrical inner surface situated adjacent the camming surface of the stator, sealing and alignment means being mounted between each cover plate and a respective surface of the stator, said sealing and alignment means being adapted to be urged against a respective side surface of the stator and against an adjacent side of the power ring means, whereby leakage from the at least one working chamber is controlled and side surface alignment between the power ring means and stator maintained, and wherein the sealing and alignment means comprises an annular plate mounted in a cooperating annular groove within each cover plate, an annular piston cup being biased against the annular plate by resilient means mounted between the cooperating annular groove and the piston cup, an enclosed chamber being formed between the piston cup and the cooperating annular groove, at least one opening passing through the annular plate and piston cup between the enclosed chamber and pressure feed means situated in the stator, at least one pin being rigidly secured to each cover plate within the annular groove therein, each pin extending through a respective at least one opening in the annular plate, the annular plate being thereby slidable along the pin in a direction perpendicular to the cover plate but restrained by the pin from angular movement with respect to the cover plate as the rotor means rotates with respect to the stator, the at least one pin having a passageway therein for communicating the enclosed chamber and the pressure feed means, whereby pressurized liquid in the pressure feed means is directed into the enclosed chamber, the pressurized liquid thereby urging the annular plate into contact with the stator and power ring.

7. A hydraulic energy converting device according to claim 1 wherein a plurality of concentric annular balancing grooves are situated in each side surface of the stator adjacent the respective annular plate, each annular balancing groove adapted to receive pressurized liquid which exerts a force against the annular plate in a direction perpendicular to the side surface of the stator.

8. A hydraulic energy converting device according to claim 1, wherein the distribution system comprises three identical distribution passages and three identical collection passages whereby volume of flow in the passages is equal.

9. A hydraulic energy converting device according to claim 6, wherein the pressure feed means comprises an annular groove in each side surface of the stator, means communicating the annular groove with a respective distribution passage within the stator, whereby pressurized liquid within the distribution passage is directed to the annular groove.

10. A hydraulic energy converting device according to claim 9, wherein the communicating means comprises a pressure feed passage having a uni-directional valve means permitting flow of pressurized liquid only in a direction from the distribution passage to the pressure feed means.

11. A hydraulic energy converting device according to claim 6 wherein the guide ring means comprises an outer open-ended cylindrical housing member and an inner cylindrical power ring, the housing member and power ring being releasably secured together by projections and cooperating grooves between the adjacent surfaces thereof, the reciprocating vanes being mounted in respective vane slots in the power ring, the vane slots being parallel to the axis of the power ring, each vane being biased radially inwards by at least two coil springs seated in a radial opening extending through the power ring from a bottom of the vane slot, one end of each spring bearing against an inner surface of the housing member and an opposite end bearing against a respective reciprocating vane.

12. A hydraulic energy converting device according to claim 11, wherein the power ring includes at least one circumferential liquid transfer passageway joining each vane slot whereby liquid entering each slot past a respective reciprocating vane is transferred through the transfer passageway from one vane slot to an adjacent vane slot as a respective reciprocating vane is urged radially outwards by the camming surface.

13. A hydraulic energy converting device according to claim 6, the stator having an axial bore therethrough at its centre, a spindle comprising a flange portion secured to an end of a shaft, the shaft adapted to be inserted into the axial bore of the stator; the flange portion and the end of the shaft remote therefrom supporting bearing means, the bearing means rotatably supporting the respective cover plates of the rotor means relative to the spindle, the flange portion adapted to be secured to the stator by suitable fastener means and including supply line connection means and discharge line connection means adapted to be aligned adjacent the distribution manifold supply inlet and the collection manifold discharge outlet respectively, whereby pressurized liquid can be supplied to and removed from the stator through connecting hoses connected between an external pressurized liquid supply system and the respective connection means.

14. A hydraulic energy converting device according to claim 13, wherein the shaft has a hollow portion intermediate its ends, the flange portion including a leak-off hose connection means which communicates with the hollow portion of the shaft, a cap releasably secured to the cover plate of the rotor means adjacent the end of the hollow shaft opposite from the flange portion, the cap forming a leak-off liquid reservoir, at least one pin hole in the shaft communicating the reservoir with the hollow portion whereby accumulated leak-off liquid is directed through the shaft and leak-off connection means.

15. A hydraulic energy converting device according to claim 14 wherein leak-off system passageways within the stator and rotor means direct the passage of leak-off liquid to the reservoir, the leak-off system including lubrication clearances between facing surfaces of the cover plates and side surfaces of the stator as well as bearings for said rotor shaft.

* * * * *